United States Patent
Hong

(10) Patent No.: US 12,457,033 B2
(45) Date of Patent: Oct. 28, 2025

(54) METHOD FOR ACCESSING SATELLITE, AND COMMUNICATION DEVICE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 400 days.

(21) Appl. No.: 18/002,402

(22) PCT Filed: Jun. 19, 2020

(86) PCT No.: PCT/CN2020/097164
§ 371 (c)(1),
(2) Date: Dec. 19, 2022

(87) PCT Pub. No.: WO2021/253421
PCT Pub. Date: Dec. 23, 2021

(65) Prior Publication Data
US 2023/0239039 A1     Jul. 27, 2023

(51) Int. Cl.
H04B 7/185     (2006.01)

(52) U.S. Cl.
CPC ..... *H04B 7/18513* (2013.01); *H04B 7/18519* (2013.01)

(58) Field of Classification Search
CPC ........ H04B 7/185–195; H04B 7/18513; H04B 7/18519
See application file for complete search history.

(56) References Cited

U.S. PATENT DOCUMENTS

| | | | |
|---|---|---|---|
| 6,989,786 B1* | 1/2006 | Dong | H04B 7/18515 342/354 |
| 10,547,374 B1* | 1/2020 | Liu | H04B 7/18595 |
| 2010/0049381 A1* | 2/2010 | Kaas | B64G 1/24 701/13 |
| 2011/0256865 A1* | 10/2011 | Sayeed | H04B 7/18589 455/427 |
| 2016/0323800 A1* | 11/2016 | Ulupinar | H04B 7/1851 |
| 2017/0230104 A1* | 8/2017 | Purkayastha | H04W 48/20 |
| 2021/0083760 A1* | 3/2021 | Schmidt | H04W 36/0058 |
| 2021/0126831 A1* | 4/2021 | Filsfils | H04L 45/50 |
| 2022/0225432 A1* | 7/2022 | Wang | H04W 74/0866 |

(Continued)

FOREIGN PATENT DOCUMENTS

| | | |
|---|---|---|
| CN | 103379435 A | 10/2013 |
| CN | 108696945 A | 10/2018 |
| CN | 110972257 A | 4/2020 |

(Continued)

OTHER PUBLICATIONS

International Search Report issued Mar. 17, 2021 in PCT/CN2020/097164 filed on Jun. 19, 2020, 4 pages (with English Translation).

*Primary Examiner* — Raymond S Dean
(74) *Attorney, Agent, or Firm* — Oblon, McClelland, Maier & Neustadt, L.L.P.

(57) ABSTRACT

A method for accessing a satellite, applied to satellites, that can include sending movement information of a satellite to a terminal. The movement information being used for the terminal to access the satellite, and the movement information including measurement configuration parameter information.

20 Claims, 7 Drawing Sheets

(56) References Cited

U.S. PATENT DOCUMENTS

2022/0286198 A1* 9/2022 Khan ............... H04W 56/0035
2023/0116580 A1* 4/2023 Cheng .............. H04W 56/0035
370/329

FOREIGN PATENT DOCUMENTS

CN 111225450 A 6/2020
WO WO 2019/242537 A1 12/2019

* cited by examiner

TERMINAL

SATELLITE

STEP 41, SEND OPERATION INFORMATION OF THE SATELLITE TO THE TERMINAL, THE OPERATION INFORMATION BEING USED FOR THE TERMIANL TO ACCESS THE SATELLITE, AND THE OPREATION INFORMATION COMPRISING MEASUREMENT CONFIGUREATION PARAMETER INFORMATION

WIRELSEE COMMUNICATION

METHOD FOR ACCESSING SATELLITE, AND COMMUNICATION DEVICE

CROSS REFERENCE TO RELATED APPLICATIONS

The present application is National Stage of International Application No. PCT/CN2020/097164, filed on Jun. 19, 2020, the entire contents of which are incorporated herein by reference in their entireties for all purposes.

FIELD OF THE INVENTION

The present disclosure relates to the technical field of wireless communications, but is not limited to the technical field of wireless communications, and in particular, to a method for accessing a satellite, a satellite, a terminal, a communication device, and a storage medium.

DESCRIPTION OF THE RELATED ART

In the related art, since the number of communication satellites sent is small, the signal coverage of the satellite network is not continuous, but varies with the movement of the communication satellite.

SUMMARY OF THE INVENTION

Embodiments of the present disclosure disclose a method for accessing a satellite, applied to a satellite, where the method includes sending movement information of the satellite to a terminal, where the movement information is configured for the terminal to access the satellite, and the movement information includes measurement configuration parameter information.

According to some embodiments of the present disclosure, there is provided a method for accessing a satellite, applied to a terminal, and where the method includes receiving movement information of the satellite sent by the satellite, where the movement information is configured for the terminal to access the satellite, and the movement information includes measurement configuration parameter information, and accessing the satellite according to the movement information.

According to some embodiments of the present disclosure, there is provided a communication device, including a processor and a memory that is configured to store an instruction executable by the processor. The processor can be configured to implement the method according to any one of the embodiments of the present disclosure, when running the executable instruction.

BRIEF DESCRIPTION OF THE DRAWINGS

Various exemplary embodiments of this disclosure that are proposed as examples will be described in detail with reference to the following figures, wherein like numerals reference like elements, and wherein.

DETAILED DESCRIPTION OF THE PREFERRED EMBODIMENTS

Embodiments will be described in detail here, examples of which are illustrated in the accompanying drawings. The following description refers to the accompanying drawings in which the same numbers in different drawings represent the same or similar elements unless otherwise represented. The implementations described in the following embodiments do not represent all implementations consistent with the embodiments of the present disclosure. Rather, they are merely examples of apparatuses and methods consistent with some aspects of the present disclosure as detailed in the appended claims.

The terminology used in the embodiments of the present disclosure is for the purpose of describing particular embodiments and is not intended to limit the embodiments of the present disclosure. As used in the embodiments of the present disclosure and the appended claims, the singular forms "a" and "the" are also intended to include plural forms unless the context clearly indicates other meanings. It should also be understood that the term "and/or" as used here refers to and includes any or all possible combinations of one or more associated listed items.

It should be understood that although the terms first, second, third, etc. may be used in the embodiments of the present disclosure to describe various information, these information should not be limited to these terms. These terms are used to distinguish the same type of information from each other. For example, without departing from the scope of the embodiments of the present disclosure, the first information may also be referred to as second information, and similarly, the second information may also be referred to as first information. Depending on the context, the word "if" as used herein May be interpreted as "on the time" or "when" or "in response to determining".

For purposes of brevity and ease of understanding, the terms used herein are "greater than" or "less than" when characterizing a size relationship. However, it can be understood by those skilled in the art that the term "greater than" also covers the meaning of "greater than or equal to", and "less than" also covers the meaning of "less than or equal to."

Figure 1:
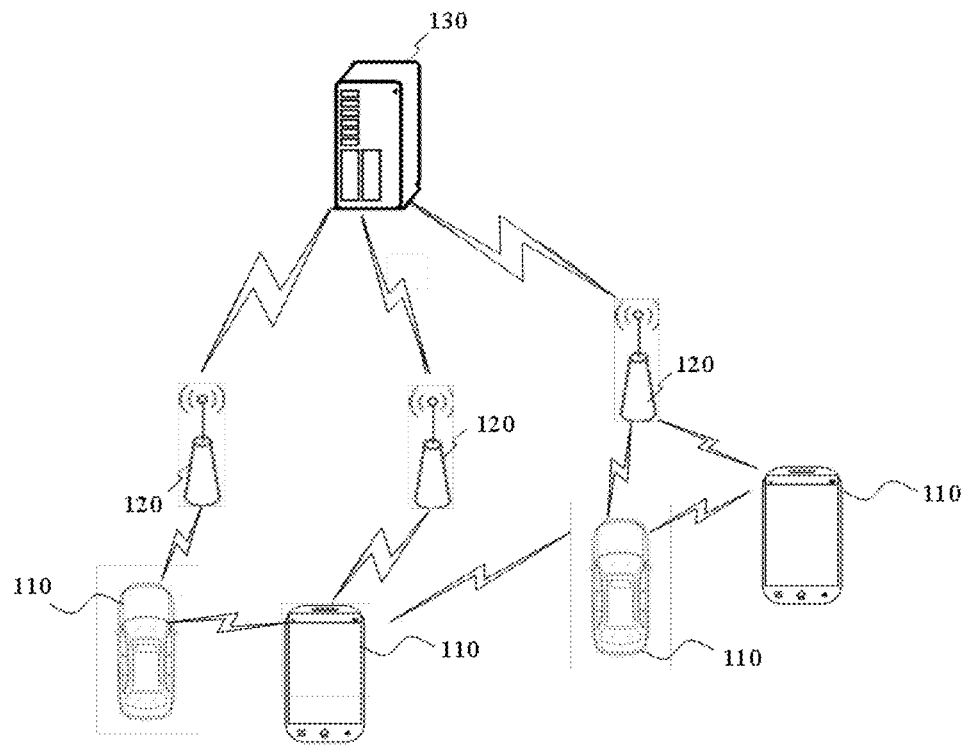
FIG. 1 is a schematic structural diagram of a wireless communication system.

FIG. 1 is a schematic structural diagram of a wireless communication system according to an embodiment of the present disclosure. As shown in FIG. 1, the wireless communication system is a communication system based on a cellular mobile communication technology, and the wireless communication system may include a plurality of user equipment 110 and a plurality of base stations 120.

Among them, the user equipment 110 may be a device that provides voice and/or data connectivity to a user. The user equipment 110 may communicate with one or more core networks via a radio access network (RAN). The user equipment 110 may be an Internet of Things user equipment, such as a sensor device, a mobile phone (or referred to as a "cellular" phone), and a computer with Internet of Things user equipment, for example, may be a fixed, portable, pocket, handheld, computer built-in or vehicle-mounted device, such as, a station (STA), a subscriber unit, a subscriber station, a mobile station, a mobile, a remote station, an access point, a remote terminal, an access terminal, a user terminal, a user agent, a user equipment, or user equipment. Alternatively, the user equipment 110 may also be a device of the unmanned aerial vehicle. Alternatively, the user equipment 110 may also be a vehicle-mounted device, for example, may be a driving computer having a wireless communication function, or a wireless user equipment externally connected to a driving computer. Alternatively, the user equipment 110 may also be a roadside device, for example, may be a street lamp, a signal light or another roadside device, etc., with a wireless communication function.

The base station 120 may be a network-side device in a wireless communication system. The wireless communication system may be a 4th generation mobile communication technology (4G) system, a long term evolution (LTE) system, or a 5G system, referred to as a new air interface system or a 5G NR system. Alternatively, the wireless communication system may also be a next generation system of the 5G system. Among them, the access network in the 5G system may be referred to as an NG-RAN (New Generation-Radio Access Network).

Among them, the base station 120 may be an evolved Node B (eNB) used in a 4G system. Alternatively, the base station 120 may also be a base station (gNB) using a centralized distributed architecture in a 5G system. When the base station 120 adopts a centralized distributed architecture, the base station 120 generally includes a central unit (CU) and at least two distributed units (DU). In the centralized unit, there is provided with a protocol stack of a packet data convergence protocol (PDCP) layer, a radio link layer control (RLC) Protocol layer, and a media access control (MAC) layer; and in the distribution unit, there is provided a physical (PHY) layer protocol stack. The specific implementation manner of the base station 120 is not limited in the embodiments of the present disclosure.

A wireless connection may be established between the base station 120 and the user equipment 110 through the wireless air interface. In different embodiments, the wireless air interface is a wireless air interface based on a fourth generation mobile communication network technology (4G) standard; or the wireless air interface is a wireless air interface based on a fifth generation mobile communication network technology (5G) standard, for example, the wireless air interface is a new air interface; or, the wireless air interface may also be a wireless air interface based on a next generation of 5G mobile communication network technology standard.

In some embodiments, an E2E (end to end) connection may also be established between the user equipment 110, such as scenes of V2V (vehicle to vehicle) communication, V2I (vehicle to infrastructure) communication and V2P (vehicle to pedestrian) communication in vehicle to everything communication (V2X).

Here, the above-mentioned user equipment may be considered to be the terminal device of the following embodiments.

In some embodiments, the wireless communication system may further include a network management device 130. The plurality of base stations 120 are respectively connected to the network management device 130. Among them, the network management device 130 may be a core network device in a wireless communication system, for example, the network management device 130 may be a mobility management entity (MME) in an evolved packet core (EPC)). Alternatively, the network management device may be another core network device, such as a serving gateway (SGW), a public data network gateway (PGW), a policy and charging rules function (PCRF), or a home subscriber server (HSS), etc. For the implementation form of the network management device 130, the embodiments of the present disclosure are not limited.

For ease of understanding of any embodiment of the present disclosure, first, a wireless communication network is described.

Satellite communication may be a communication between radio communication stations on the ground using a communication satellite as a relay station to forward radio waves. The communication function of the communication satellite includes at least one of the following: receiving a signal, changing the frequency of the signal, amplifying the signal, forwarding the signal, and positioning.

Figure 2:
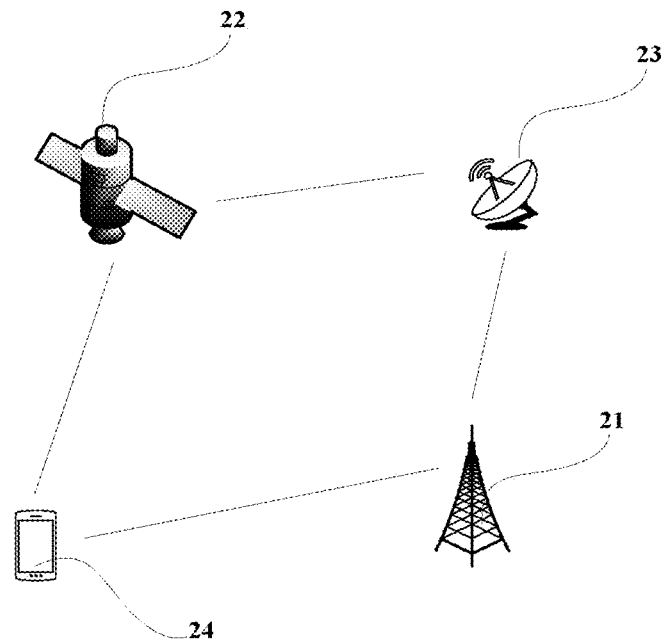
FIG. 2 is a schematic structural diagram of a wireless communication system according to an embodiment.

In some embodiments, referring to FIG. 2, the wireless communication network may be a network integrating a mobile communication network and a satellite communication network. Among them, the mobile communication network includes a base station 21, and the satellite communication network includes a communication satellite 22 and a gateway station 23 of the communication satellite.

In some embodiments, the base station 21 may establish a wireless communication connection with the gateway station 23. The terminal 24 may establish a wireless communication connection with the base station 21. The terminal 24 may establish a wireless communication connection with the satellite 22. Here, the terminal 24 may be a multi-mode terminal, and the multi-mode terminal is a terminal that supports both wireless communication with the satellite 22 and communication with the base station 21.

Figure 3:
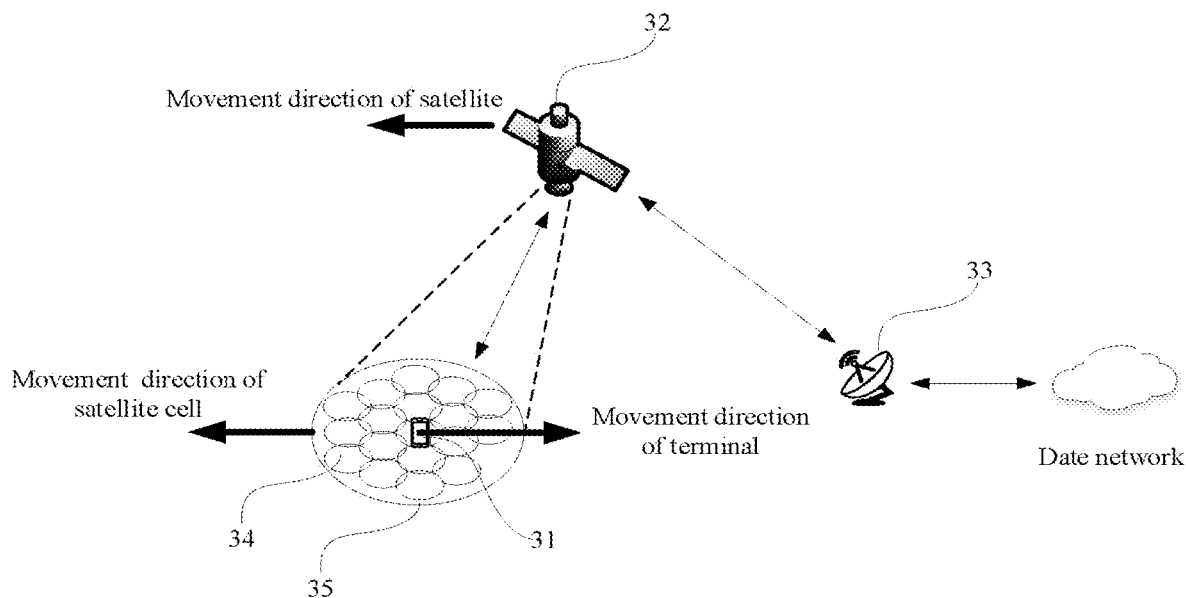
FIG. 3 is a schematic structural diagram of a wireless communication system according to an embodiment.

In some embodiments, referring to FIG. 3, the wireless communication network includes a terminal 31, the communication satellite 32 and the gateway station 33. The region 34 is a region covered by signals of an antenna on a satellite, and the region 35 is a satellite cell of the communication satellite 32.

In some embodiments, the motion direction of the satellite is leftward, and the motion direction of the satellite cell follows the motion direction of the satellite to be leftward. The movement direction of the terminal is opposite to the motion direction of the satellite, and the movement direction of the terminal is rightward. At this time, as shown in FIG. 3, in the horizontal direction, the relative distance between the terminal 31 and the communication satellite 32 becomes closer.

In some embodiments, the motion direction of the satellite is rightward, and the motion direction of the satellite cell follows the motion direction of the satellite to be rightward. The movement direction of the terminal is opposite to the motion direction of the satellite, and the movement direction of the terminal is leftward. At this time, in the horizontal direction, the relative distance between the terminal 31 and the communication satellite 32 is increasingly distant.

Figure 4:
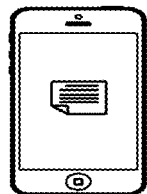
FIG. 4 is a flowchart of a method for accessing a satellite according to an embodiment.
Figure 4:
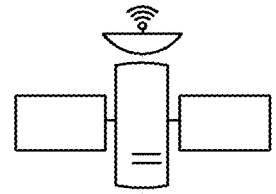

As shown in FIG. 4, the present embodiment provides a method for accessing a satellite, where the method is applied to a satellite, and the method includes that, in step 41, movement information of the satellite is sent to the terminal. Among them, the movement information is used for the terminal to access a satellite, and the movement information includes measurement configuration parameter information.

The terminal may be, but is not limited to, a mobile phone, a wearable device, a vehicle-mounted terminal, a road side unit (RSU), a smart home terminal, an industrial sensing device, and/or a medical device.

In some embodiments, the satellite may have a function of a base station. Here, the satellite may be an interface device accessing the network for the terminal. Here, the functions of the base station may be functions of various types of base stations, for example, functions of a base station of a third generation mobile communication (3G) network, functions of a base station of a fourth generation mobile communication (4G) network, functions of a base station of a fifth generation mobile communication (5G) network, or functions of other evolved base stations. In some embodiments, the satellite is a flying base station. Here, the flying base station may be deployed in an airspace with a small ground base station density and a poor wireless communication environment.

In some embodiments, the terminal accessing the satellite may accessing the satellite in response to startup of the terminal, or may be accessing the satellite after satellite cell selection or satellite reselection is performed by the terminal in an idle state, or may be accessing the satellite after satellite cell reselection is performed by the terminal in a connected state and then switched from another satellite.

In some embodiments, before the terminal accesses the satellite, the terminal may measure the parameters associated with the satellite, and when the parameters associated with the satellite meet the setting condition, the terminal may select the satellite for access. Here, the parameters associated with the satellite may include a motion speed of the terminal relative to the satellite and an offset direction of the terminal relative to the satellite, etc.

In some embodiments, the setting condition includes that a motion speed of the terminal relative to the satellite is less than a speed threshold and/or an offset of a motion direction of the terminal relative to the satellite is less than an offset threshold.

In some embodiments, the measurement configuration parameter information includes at least one of the following information direction coefficient information, including an offset of the motion direction of the satellite relative to the reference direction, and configured for the terminal to measure a relative offset of a movement direction of the terminal relative to the motion direction of the satellite, speed coefficient information, including a ratio of a motion speed of the satellite relative to a reference speed, and configured for the terminal to measure a relative movement speed of the terminal relative to the satellite.

In some embodiments, the parameters associated with the satellite measured by the terminal include an offset of the movement direction of the terminal relative to the motion direction of the satellite. At any moment, the terminal can measure the offset of the movement direction of the terminal relative to a certain fixed reference direction, and since the satellite is moving at time, the offset of the movement direction of the terminal relative to the motion direction of the satellite cannot be measured. Here, the measurement configuration parameter information may include an offset of the motion direction of the satellite at any moment relative to the fixed reference direction. In this way, after receiving the measurement configuration parameter information, the terminal may determine the offset of the direction of the movement of the terminal relative to the motion direction of the satellite according to the measured offset of the movement direction of the terminal relative to a certain fixed reference direction and the offset of the motion direction of the satellite at any moment relative to the fixed reference direction contained in the measurement configuration parameter information.

In some embodiments, the measurement configuration parameter information includes direction coefficient information, including an offset of a motion direction of the satellite relative to a reference direction, and configured for the terminal to measure a relative offset of a movement direction of the terminal relative to the motion direction of the satellite. Here, the reference direction may be a reference direction toward which the terminal moves.

In some embodiments, the reference direction of the movement of the terminal is direction A, and at moment a, the offset of the motion direction of the satellite measured by the satellite relative to the direction A is 30° (here, 30° is $\frac{1}{12}$ of 360°, and the corresponding direction coefficient is $\frac{1}{12}$). The offset of the movement direction of the terminal measured by the terminal relative to the direction A is 120°, and the relative offset of the movement direction of the terminal measured by the terminal relative to the motion direction of the satellite is x1=120°−30°=90°, i.e., 90° is the relative offset of the movement direction of the terminal measured by the terminal relative to the motion direction of the satellite.

In some embodiments, the reference direction of the movement of the terminal is direction A, and at moment b, the offset of the motion direction of the satellite relative to the direction A measured by the satellite is −30° (here, −30° is $\frac{1}{12}$ of 360°, and the corresponding direction coefficient is $-\frac{1}{12}$). The offset of the movement direction of the terminal measured by the terminal relative to the direction A is 120°, and the relative offset of the movement direction of the terminal measured by the terminal relative to the motion direction of the satellite is x1=120°−(−30°)=150°, that is, 150° is the relative offset of the movement direction of the terminal measured by the terminal relative to the motion direction of the satellite. In some embodiments, the measurement configuration parameter information includes parameter information used for terminal measurement and parameter information used for terminal calculation. Here, the direction coefficient information may be parameter information used for terminal calculation. In this embodiment, the terminal can accurately obtain the offset of the movement direction of the terminal relative to the motion direction of the satellite, so that the terminal can reliably access the satellite based on the offset.

In some embodiments, the parameters associated with the satellite include a motion speed of terminal relative to the satellite. At any moment, the terminal can measure the relative speed of the terminal relative to a certain fixed reference speed (such as the rotation speed of the earth), and since the satellite is moving at time, the reference speed of the terminal relative to the satellite cannot be measured. Here, the measurement configuration parameter information may include a relative speed of the satellite relative to the fixed reference speed at any moment. In this way, after receiving the measurement configuration parameter information, the terminal may determine the relative speed of the terminal relative to the satellite according to the measured relative speed of the terminal relative to a fixed reference speed and the relative speed of the satellite relative to the fixed reference speed at any moment contained in the measurement configuration parameter information.

In some embodiments, the measurement configuration parameter information includes: speed coefficient information, including a ratio of a motion speed of the satellite relative to a reference speed, and configured for the terminal to measure a relative movement speed of the terminal relative to the satellite. Here, the reference speed is the reference speed in which the terminal moves. In some embodiments, the reference speed in which the terminal moves is the rotation speed of the earth, and at moment a, the ratio of the motion speed of the satellite measured by the satellite to the reference speed is 3, and if the reference speed is 100, the motion speed of the satellite is 300. The difference of the movement speed of the terminal measured by the terminal relative to the reference speed is 400, and the relative difference of the movement speed of the terminal measured by the terminal relative to the motion speed of the satellite is y1=400−300=100. That is, 100 is the relative movement speed of the terminal measured by the terminal relative to the satellite. In some embodiments, the reference speed in which the terminal moves is the rotation speed of the earth, at moment b, the ratio of the motion speed of the satellite measured by the satellite to the reference speed is −3, and if the reference speed is 100, the motion speed of the satellite is actually −300. The difference of the movement speed of the terminal measured by the terminal relative to the reference speed is 400, and the relative difference of the movement speed of the terminal measured by the terminal relative to the motion speed of the satellite is y2=400−(−300)=700, that is, 700 is the relative movement speed of the terminal measured by the terminal relative to the satellite. In some embodiments, the measurement configuration parameter information includes parameter information used for terminal measurement and parameter information used for terminal calculation. Here, the speed coefficient information may be parameter information used for terminal calculation. In this embodiment, the terminal can accurately obtain the relative movement speed of the terminal relative to the satellite, so that the terminal can reliably access the satellite based on the relative movement speed.

In some embodiments, the movement information includes at least one of the movement information of the satellite and the movement information of the satellite cell formed by the satellite.

The movement information of the satellite is information associated with the motion of the body of the satellite, such as, the movement speed information, the movement direction information and/or the movement position of the satellite at any moment, etc.

The movement information of the satellite cell formed by the satellite may be the movement speed information, the movement direction information and/or the movement position information at any moment, etc. of the satellite cell.

In some embodiments, the movement speed information of the satellite cell may be movement speed information of a reference point set in a satellite cell. The movement direction information of the satellite cell may be movement direction information of a reference point set in a satellite cell. The movement position information of the satellite cell may be coordinate information of a reference point set in the satellite cell. Here, the reference point may be a center point of the satellite cell. Here, the satellite cell is an area covered by a satellite signal.

In some embodiments, the satellite cell further includes a plurality of sub-cells, and each sub-cell corresponds to one antenna of the satellite. A plurality of antennas may be provided on a satellite. The signal coverage range of each antenna corresponds to one sub-cell.

In some embodiments, the movement information of the satellite includes at least one of the following information: moving direction information of the satellite; movement speed information of the satellite; and position information of the satellite.

In some embodiments, the movement direction of the satellite may be a movement direction of the satellite relative to the reference direction. For example, the reference direction here may be the rotation direction of the earth. In some embodiments, the motion trajectory of the satellite is preset, and the movement direction of the satellite at any moment is fixed. Therefore, the satellite may send the movement direction information of the satellite at any moment or time period to the terminal by the measurement configuration parameter information.

In some embodiments, the movement speed of the satellite may be a movement speed of the satellite relative to the reference speed. For example, the movement speed of the satellite may be the movement speed of the satellite relative to the rotation speed of the earth.

In some embodiments, the motion trajectory and the motion period of the satellite are preset, and the movement speed of the satellite at any moment is fixed. Therefore, the satellite may send the movement speed information of the satellite at any moment or time period to the terminal by the measurement configuration parameter information.

In some embodiments, the position of the satellite may be the position of the satellite relative to the reference coordinate system. For example, the coordinate position here is a position relative to a ground coordinate system. In some embodiments, the motion trajectory and the movement period of the satellite are preset, and the position of the satellite at any moment is fixed. Therefore, the satellite may send the position information of the satellite at any moment or time period to the terminal by the measurement configuration parameter information.

In some embodiments, the movement information of the satellite cell includes at least one of the following information: movement direction information of the satellite cell; movement speed information of the satellite cell; and position information of the satellite cell.

Here, each satellite corresponds to one satellite cell. The satellite cell moves along with the movement of the satellite.

In some embodiments, the movement direction of the satellite cell may be a movement direction of the satellite cell relative to the reference direction. For example, the reference direction here may be the rotation direction of the earth. In some embodiments, the motion trajectory of the satellite cell is preset, and the movement direction of the satellite cell at any moment is fixed. Therefore, the satellite cell may send the movement direction information of the satellite cell at any moment or time period to the terminal by the measurement configuration parameter information.

In some embodiments, the movement speed of the satellite cell may be the movement speed of the satellite cell relative to the reference speed. For example, the movement speed of the satellite cell may be the movement speed of the satellite cell relative to the rotation speed of the earth. In some embodiments, the motion trajectory and the motion period of the satellite cell are preset, and the movement speed of the satellite cell at any moment is fixed. Therefore, the satellite cell may send the movement speed information of the satellite at any moment or time period to the terminal by the measurement configuration parameter information.

In some embodiments, the position of the satellite cell may be the position of the satellite cell relative to the reference coordinate system. For example, the coordinate position here is a position relative to a ground coordinate system. In some embodiments, the motion trajectory and the motion period of the satellite cell are preset, and the position of the satellite cell at any moment is fixed. Therefore, the satellite cell may send the position information of the satellite cell at any moment or time period to the terminal by the measurement configuration parameter information.

In some embodiments, the movement information carries an identity document (ID) of the satellite. Here, the identity document of the satellite is used to uniquely identify a satellite. The identity document (ID) of the satellite may be associated with other information of the satellite. For example, the identity document of the satellite is "A", and then "A" may be associated with the movement trajectory information of the satellite, the movement speed information of the satellite, the movement direction information of the satellite, the position information of the satellite, and the signal coverage range information to establish a corresponding mapping relationship. In some embodiments, after the terminal receives the movement information, as shown in Table 1, the mapping relationship may be stored in the terminal in the form of a list. For the satellite with a satellite identifier of "A", the movement speed is S1, the movement direction is K1, and the position of the satellite is C1; for the satellite with a satellite identifier of "B", the movement speed is S2, the movement direction is K2, and the position of the satellite is C2.

TABLE 1

| Satellite Identifier | Movement Speed Information of the Satellite | Movement Direction Information of the Satellite | Position Information of the Satellite |
|---|---|---|---|
| A | S1 | K1 | C1 |
| B | S2 | K2 | C2 |

In some embodiments, the satellite sends the movement information of the satellite to the terminal for the terminal to access the satellite, in response to the terminal establishing a radio resource control (RRC) connection with the satellite. In this way, when the terminal needs to access the satellite again at the next time, the terminal may determine whether to access the satellite using the movement information. For example, at moment A, the terminal establishes a radio resource control (RRC) connection with the satellite 1, and the satellite 1 sends the movement information of the satellite 1 to the terminal for the terminal to access the satellite 1. At moment B, the terminal in the idle state needs to access the satellite again, and at this time, the terminal and the satellite 1 move in the opposite direction, the movement speed of the terminal is a, the movement speed of the satellite 1 indicated by the movement information is b, the speed of the terminal relative to the satellite 1 is x=a+b, and when x is smaller than the access threshold X for accessing the satellite 1, the terminal may select the satellite 1 to access and establish a connection with the satellite 1.

In some embodiments, the satellite stores with movement information of a plurality of satellites. The satellite storing with the movement information of the plurality of satellites may simultaneously send the movement information of the plurality of satellites to the terminal for the terminal to select one of the satellites for access.

In some embodiments, after receiving the movement information of the satellite sent by each satellite for the terminal to access the satellite, the terminal stores the movement information. For example, the terminal sequentially receives the movement information sent by the satellite 1, the satellite 2 and the satellite 3, and the terminal sequentially stores the movement information sent by the satellite 1, the satellite 2 and the satellite 3. In some embodiments, the movement information carries identifier information of a corresponding satellite, and the terminal may store the movement information of the corresponding satellite according to the identifier information.

In some embodiments, the movement trajectory of the satellite is updated, and the movement information of the satellite is updated synchronously. The satellite sends the updated movement information of the satellite to the terminal for the terminal to access the satellite, in response to the terminal establishing a radio resource control (RRC) connection with the satellite. After receiving the updated movement information, the terminal updates the movement information of the satellite stored in the terminal synchronously by using the updated movement information. In some embodiments, the satellite control center may update the movement trajectory of the satellite. For example, at time period A, the satellite operates on orbit A. At time period B, the satellite is controlled to operate on orbit B according to the scheduling strategy of the satellite control center. At this time, the satellite control center updates the movement trajectory of the satellite, and the movement information of the satellite may also be updated synchronously.

In some embodiments, when the terminal establishes a radio resource control (RRC) connection with the satellite, the terminal sends an acquisition request for the movement information of the satellite to the satellite, and after receiving the acquisition request, the satellite sends the movement information of the satellite associated with the acquisition request to the terminal for the terminal to access the satellite. Here, the terminal periodically sends the acquisition request to the satellite until the movement information of the satellite associated with the acquisition request for the terminal to access the satellite fed back by the satellite is received. In this way, the situation that the satellite cannot receive the acquisition request due to the poor wireless communication environment with the satellite is reduced, and the reliability of obtaining the request transmission is improved.

In some embodiments, the satellite sends movement information associated with the acquisition request to the terminal in response to receiving an acquisition request for the movement information sent by the terminal to the satellite after receiving a trigger instruction from the user. For example, the terminal works in a remote mountainous environment, the density of the base station is small, the signal coverage is poor, resulting in that the signal environment is not good, and there is the condition of abnormal network connection frequently when the user uses the terminal. At this time, the user may trigger the terminal to send an acquisition request for the movement information to the satellite. After receiving the acquisition request, the satellite sends the movement information associated with the acquisition request to the terminal. In this way, the terminal may use the movement information to access the satellite. Due to the fact that the communication signal of the satellite is less affected by the mountainous environment, the terminal performs wireless communication through the satellite, so that the communication experience of the user can be improved.

In some embodiments, the satellite sends movement information associated with the acquisition request to the terminal in response to an acquisition request for the movement information sent to the satellite after the strength of the wireless communication signal sent by the base station detected by the terminal is less than the first signal threshold. For example, the terminal works in a remote mountainous area, the density of the base station is small, and the signal coverage is poor, resulting in that the signal environment is not good. When the strength of the wireless communication signal detected by the terminal is less than the first signal threshold, it may trigger an acquisition request for the movement information sent by the terminal to the satellite. After receiving the acquisition request, the satellite sends the movement information associated with the acquisition request to the terminal. In this way, the terminal may use the movement information to access the satellite. In this way, the terminal may use the movement information to establish a wireless communication connection with the satellite. Due to the fact that the communication signal of the satellite is less affected by the mountainous environment, the terminal performs wireless communication through the satellite, so that the communication experience of the user can be improved.

In some embodiments, the first signal threshold is less than the second signal threshold, and the second signal threshold is a signal threshold of switching from communication with the first base station to communication with the second base station, configured for the situation of signal strength becoming weaker when the terminal communicates with the first base station. In this way, since the first signal threshold is less than the second signal threshold, the switch condition for switching from the first base station to the second base station may be satisfied. When there is a second base station available for connection, the terminal switches from communication with the first base station to communication with the second base station, instead of sending the acquisition request for acquiring the movement information of the satellite to the satellite to acquire the movement information and access the satellite. In this way, the situation of unnecessary access to the satellite when the terminal has the second base station for switch is reduced.

In some embodiments, the satellite receives an acquisition request for the movement information sent by the terminal to the satellite when it starts up, and sends the movement information associated with the acquisition request to the terminal. After receiving the acquisition request sent by the base station, the satellite sends the movement information associated with the switch request to the terminal. In this way, the terminal may select a satellite cell of one satellite to reside according to the movement information.

In some embodiments, the satellite receives an acquisition request for the movement information sent by the terminal to the satellite when needing to perform cell switch, and sends the movement information associated with the acquisition request to the terminal. In this way, the terminal may select a satellite cell of a satellite for switch according to the movement information.

In some embodiments, the satellite sends the movement information associated with the switch request to the terminal in response to receiving the switch request sent by the base station. For example, the quantity of loads connected to the base station exceeds a quantity threshold, and in order to reduce the load of the base station, the base station sends a switch request for requesting the satellite to allow the terminal to establish a wireless communication connection with the satellite. After receiving the switch request sent by the base station, the satellite sends the movement information associated with the switch request to the terminal. In this way, the terminal may use the movement information to establish wireless communication with the satellite, thus alleviating the pressure that the quantity of connected loads of the base station exceeds the quantity threshold. In some embodiments, the switch request sent by the base station to the satellite carries identifier information of the terminal. In response to receiving the switch request sent by the base station, the satellite sends the movement information associated with the switch request to the terminal indicated by the identifier information. The identifier information is used to uniquely identify the terminal. Here, the identifier information of the terminal may be a subscriber identity module (SIM) number of a subscriber identity module (SIM) included in the terminal.

In the embodiments of the present disclosure, the satellite sends the movement information of the satellite to all terminals within the coverage range of the satellite signal for the terminals to access the satellite.

In the embodiments of the present disclosure, when the terminal needs to access the satellite, the terminal can measure the parameters related to the accessed satellite based on the movement information of the satellite, and the terminal measures the related parameters by integrating the movement information of the satellite. Compared with the measurement of the related parameters under the condition of not considering the motion of the satellite, the related parameters measured by the present scheme can be more accurate, so that the terminal can reliably access the satellite for wireless communication.

Figure 5:
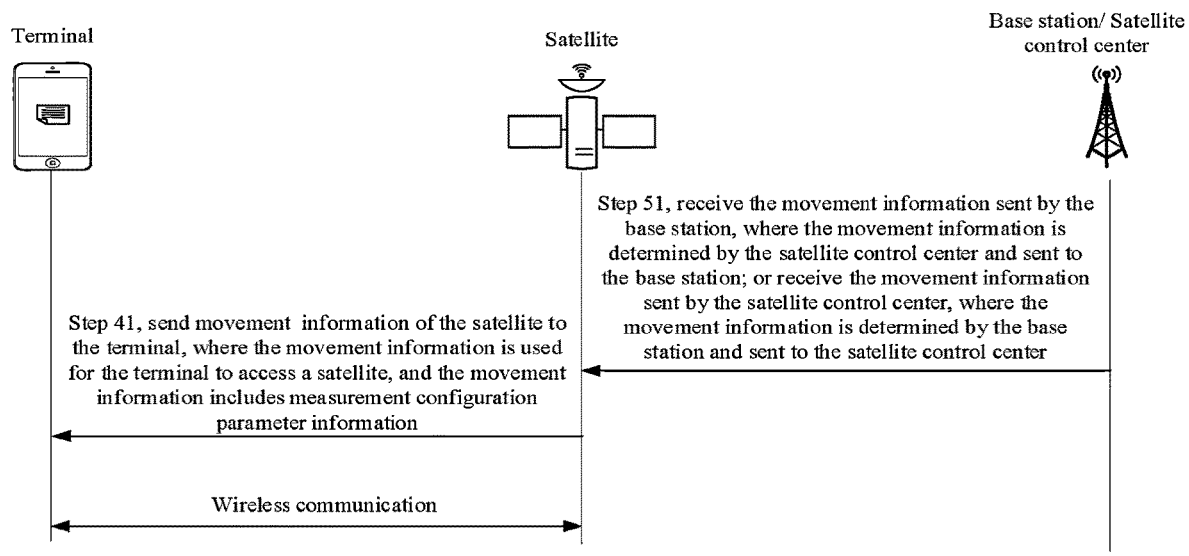
FIG. 5 is a flowchart of a method for accessing a satellite according to an embodiment.

As shown in FIG. 5, the present embodiment provides a method for accessing a satellite, where the method further includes that, in step 51, movement information sent by the base station is received, where the movement information is determined by the satellite control center and sent to the base station. Alternatively, movement information sent by the satellite control center is received, where the movement information is determined by the base station and sent to the satellite control center.

In some embodiments, the base station may establish a communication connection with a satellite. The satellite control center may determine a movement trajectory and a motion period of the satellite. Here, the movement information may include speed information, direction information, position information, and/or motion period information of satellite movement. The base station sends the movement information to the satellite in response to receiving the movement information sent by the satellite control center. In some embodiments, the satellite may send an acquisition request for the movement information to the base station, and the base station sends the movement information to the satellite in response to receiving the acquisition request.

In some embodiments, the satellite control center may establish a communication connection with a satellite. The base station may determine a movement trajectory and a motion period of the satellite. Here, the movement information may include speed information, direction information, position information, and/or motion period information of satellite movement. The satellite control center sends the movement information to the satellite in response to receiving the movement information sent by the base station. In some embodiments, the satellite may send an acquisition request for the movement information to the satellite control center, and the satellite control center sends movement information to the satellite in response to receiving the acquisition request.

Figure 6:
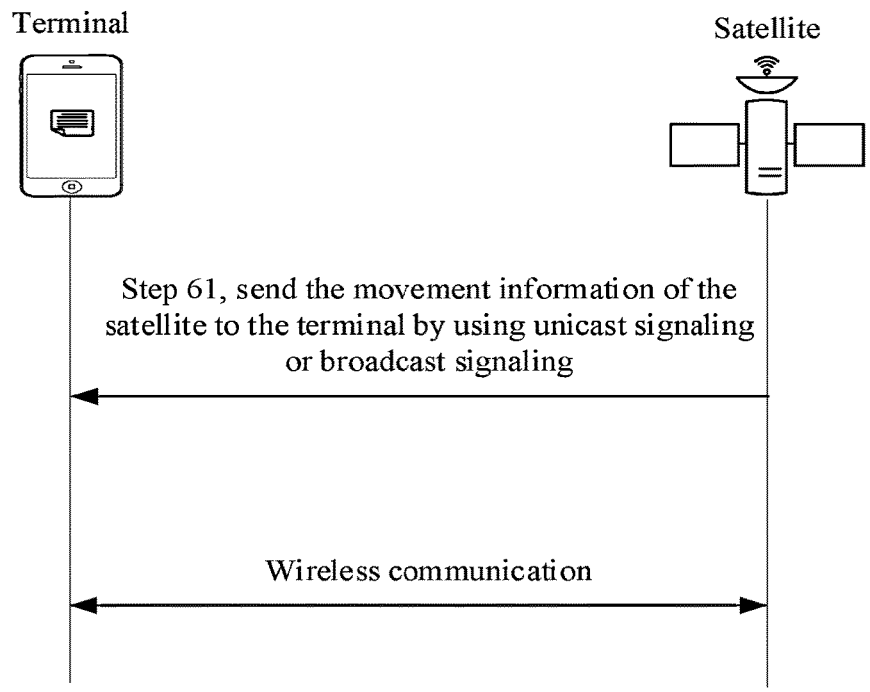
FIG. 6 is a flowchart of a method for accessing a satellite according to an embodiment.

As shown in FIG. 6, the present embodiment provides a method for accessing a satellite, where in step 41, sending movement information of a satellite to a terminal including that, in step 61, the movement information of the satellite is sent to the terminal by using unicast signaling or broadcast signaling.

In some embodiments, unicast signaling and/or broadcast signaling is radio resource control (RRC) signaling. In this way, the existing radio resource control (RRC) signaling can be used to carry the movement information, thereby realizing multiplexing of the radio resource control (RRC) signaling, and improving the compatibility of the signaling.

Figure 7:
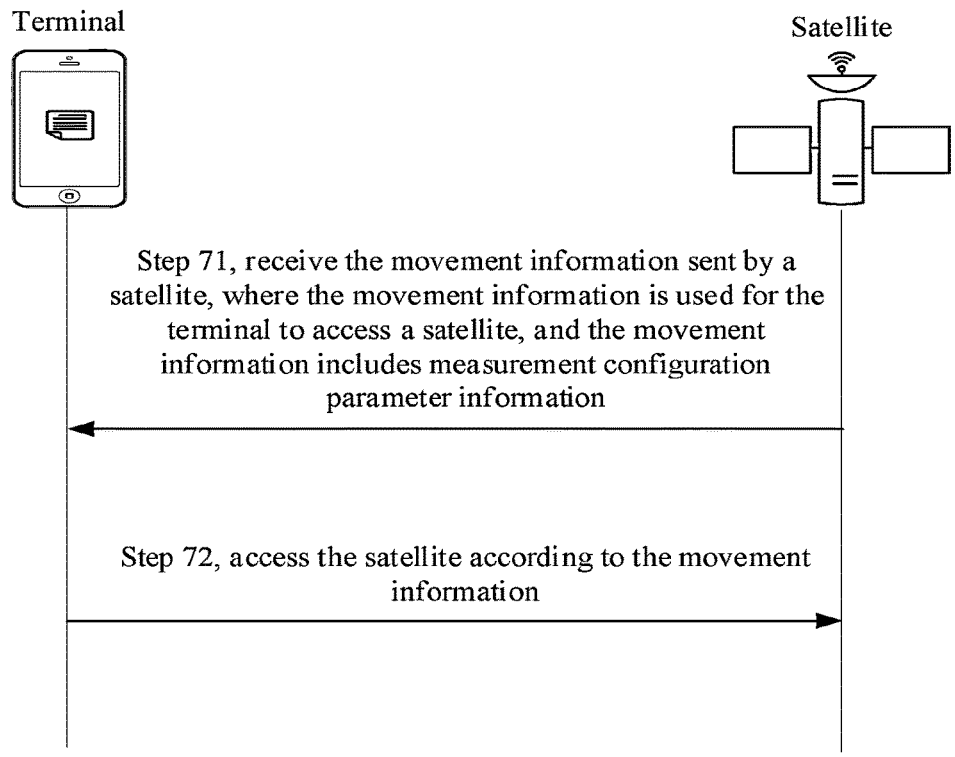
FIG. 7 is a flowchart of a method for accessing a satellite according to an embodiment.

As shown in FIG. 7, the present embodiment provides a method for accessing a satellite, where the method is applied to a terminal, and the method includes that, in step 71, movement information of a satellite sent by a satellite is received, where the movement information is used for the terminal to access a satellite, and the movement information includes measurement configuration parameter information.

In step 72, the satellite is accessed according to the movement information.

The terminal may be, but is not limited to, a mobile phone, a wearable device, a vehicle-mounted terminal, a road side unit (RSU), a smart home terminal, an industrial sensing device, and/or a medical device.

In some embodiments, the satellite may have a function of a base station. Here, the satellite may be an interface device accessing the network for the terminal. Here, the functions of the base station may be functions of various types of base stations, for example, functions of a base station of a third generation mobile communication (3G) network, functions of a base station of a fourth generation mobile communication (4G) network, functions of a base station of a fifth generation mobile communication (5G) network, or functions of other evolved base stations. In some embodiments, the satellite is a flying base station. Here, the flying base station may be deployed in an airspace with a small ground base station density and a poor wireless communication environment.

In some embodiments, the terminal accessing the satellite may accessing the satellite in response to startup of the terminal, or may be accessing the satellite after satellite cell selection or satellite reselection is performed by the terminal in an idle state, or may be accessing the satellite after satellite cell reselection is performed by the terminal in a connected state and then switched from another satellite.

In some embodiments, before the terminal accesses the satellite, the terminal may measure the parameters associated with the satellite, and when the parameters associated with the satellite meet the setting condition, the terminal may select the satellite for access. Here, the parameters associated with the satellite may include a motion speed of the terminal relative to the satellite and an offset direction of the terminal relative to the satellite, etc.

In some embodiments, the setting condition includes that a motion speed of the terminal relative to the satellite is less than a speed threshold and/or an offset of a motion direction of the terminal relative to the satellite is less than an offset threshold.

In some embodiments, the measurement configuration parameter information includes at least one of the following information: direction coefficient information, including an offset of the motion direction of the satellite relative to the reference direction, and configured for the terminal to measure a relative offset of a movement direction of the terminal relative to the motion direction of the satellite; and speed coefficient information, including a ratio of a motion speed of the satellite relative to a reference speed, and configured for the terminal to measure a relative movement speed of the terminal relative to the satellite.

In some embodiments, the parameters associated with the satellite measured by the terminal include an offset of the movement direction of the terminal relative to the motion direction of the satellite. At any moment, the terminal can measure the offset of the movement direction of the terminal relative to a certain fixed reference direction, and since the satellite is moving at time, the offset of the movement direction of the terminal relative to the motion direction of the satellite cannot be measured. Here, the measurement configuration parameter information may include an offset of the motion direction of the satellite at any moment relative to the fixed reference direction. In this way, after receiving the measurement configuration parameter information, the terminal may determine the offset of the direction of the movement of the terminal relative to the motion direction of the satellite according to the measured offset of the movement direction of the terminal relative to a certain fixed reference direction and the offset of the motion direction of the satellite at any moment relative to the fixed reference direction contained in the measurement configuration parameter information.

In some embodiments, the measurement configuration parameter information includes: direction coefficient information, including an offset of a motion direction of the satellite relative to a reference direction, and configured for the terminal to measure a relative offset of a movement direction of the terminal relative to the motion direction of the satellite. Here, the reference direction may be a reference direction toward which the terminal moves. In some embodiments, the reference direction of the movement of the terminal is direction A, and at moment a, the offset of the motion direction of the satellite measured by the satellite relative to the direction A is 30° (here, 30° is $1/12$ of 360°, and the corresponding direction coefficient is $1/12$). The offset of the movement direction of the terminal measured by the terminal relative to the direction A is 120°, and the offset of the movement direction of the terminal measured by the terminal relative to the motion direction of the satellite is $x1=120°-30°=90°$, i.e., 90° is the relative offset of the movement direction of the terminal measured by the terminal relative to the motion direction of the satellite. In some embodiments, the reference direction of the movement of the terminal is direction A, and at moment b, the offset of the motion direction of the satellite measured by the satellite relative to the direction A is $-30°$ (here, $-30°$ is $1/12$ of 360°, and the corresponding direction coefficient is $-1/12$). The offset of the movement direction of the terminal measured by the terminal relative to the direction A is 120°, and the offset of the movement direction of the terminal measured by the terminal relative to the motion direction of the satellite is $x1=120°-(-30°)=150°$, that is, 150° is the relative offset of the movement direction of the terminal measured by the terminal relative to the motion direction of the satellite. In some embodiments, the measurement configuration parameter information includes parameter information used for terminal measurement and parameter information used for terminal calculation. Here, the direction coefficient information may be parameter information used for terminal calculation. In this embodiment, the terminal can accurately obtain the offset of the movement direction of the terminal relative to the motion direction of the satellite, so that the terminal can reliably access the satellite based on the offset.

In some embodiments, the parameters associated with the satellite include a motion speed of terminal relative to the satellite. At any moment, the terminal can measure the relative speed of the terminal relative to a certain fixed reference speed (such as the rotation speed of the earth), and since the satellite is moving at time, the reference speed of the terminal relative to the satellite cannot be measured. Here, the measurement configuration parameter information may include a relative speed of the satellite relative to the fixed reference speed at any moment. In this way, after receiving the measurement configuration parameter information, the terminal may determine the relative speed of the terminal relative to the satellite according to the measured relative speed of the terminal relative to a fixed reference speed and the relative speed of the satellite relative to the fixed reference speed at any moment contained in the measurement configuration parameter information.

In some embodiments, the measurement configuration parameter information includes: speed coefficient information, including a ratio of a motion speed of the satellite relative to a reference speed, and configured for the terminal to measure a relative movement speed of the terminal relative to the satellite. Here, the reference speed is the reference speed in which the terminal moves. In some embodiments, the reference speed in which the terminal moves is the rotation speed of the earth, and at moment a, the ratio of the motion speed of the satellite measured by the satellite to the reference speed is 3, and if the reference speed is 100, the motion speed of the satellite is 300. The difference of the movement speed of the terminal measured by the terminal relative to the reference speed is 400, and the relative difference of the movement speed of the terminal measured by the terminal relative to the motion speed of the satellite is $y1=400-300=100$. That is, 100 is the relative movement speed of the terminal measured by the terminal relative to the satellite. In some embodiments, the reference speed in which the terminal moves is the rotation speed of the earth, at moment b, the ratio of the motion speed of the satellite measured by the satellite to the reference speed is −3, and if the reference speed is 100, the motion speed of the satellite is actually −300. The difference of the movement speed of the terminal measured by the terminal relative to the reference speed is 400, and the relative difference of the movement speed of the terminal measured by the terminal relative to the motion speed of the satellite is $y2=400-(-300)=700$, that is, 700 is the relative movement speed of the terminal measured by the terminal relative to the satellite. In some embodiments, the measurement configuration parameter information includes parameter information used for terminal measurement and parameter information used for terminal calculation. Here, the speed coefficient information may be parameter information used for terminal calculation. In this embodiment, the terminal can accurately obtain the relative movement speed of the terminal relative to the satellite, so that the terminal can reliably access the satellite based on the relative movement speed.

In some embodiments, the movement information includes at least one of the movement information of the satellite and the movement information of the satellite cell formed by the satellite.

The movement information of the satellite is information associated with the motion of the body of the satellite, such as, the movement speed information, the movement direction information and/or the movement position of the satellite at any moment, etc.

The movement information of the satellite cell formed by the satellite may be the movement speed information, the movement direction information and/or the movement position information at any moment, etc. of the satellite cell. In some embodiments, the movement speed information of the satellite cell may be movement speed information of a reference point set in a satellite cell. The movement direction information of the satellite cell may be movement direction information of a reference point set in a satellite cell. The movement position information of the satellite cell may be coordinate information of a reference point set in the satellite cell. Here, the reference point may be a center point of the satellite cell. Here, the satellite cell is an area covered by a satellite signal. In some embodiments, the satellite cell further includes a plurality of sub-cells, and each sub-cell corresponds to one antenna of the satellite. A plurality of antennas may be provided on a satellite. The signal coverage range of each antenna corresponds to one sub-cell.

In some embodiments, the movement information of the satellite includes at least one of the following information: moving direction information of the satellite; movement speed information of the satellite; and position information of the satellite.

In some embodiments, the movement direction of the satellite may be a movement direction of the satellite relative to the reference direction. For example, the reference direction here may be the rotation direction of the earth. In some embodiments, the motion trajectory of the satellite is preset, and the movement direction of the satellite at any moment is fixed. Therefore, the satellite may send the movement direction information of the satellite at any moment or time period to the terminal by the measurement configuration parameter information.

In some embodiments, the movement speed of the satellite may be a movement speed of the satellite relative to the reference speed. For example, the movement speed of the satellite may be the movement speed of the satellite relative to the rotation speed of the earth. In some embodiments, the motion trajectory and the motion period of the satellite are preset, and the movement speed of the satellite at any moment is fixed. Thus, the satellite may send the movement speed information of the satellite at any moment or time period to the terminal by the measurement configuration parameter information.

In some embodiments, the position of the satellite may be the position of the satellite relative to the reference coordinate system. For example, the coordinate position here is a position relative to a ground coordinate system. In some embodiments, the motion trajectory and the movement period of the satellite are preset, and the position of the satellite at any moment is fixed. Thus, the satellite may send the position information of the satellite at any moment or time period to the terminal by the measurement configuration parameter information.

In some embodiments, the movement information of the satellite cell includes at least one of the following information: movement direction information of the satellite cell; movement speed information of the satellite cell; and position information of the satellite cell.

Here, each satellite corresponds to one satellite cell. The satellite cell moves along with the movement of the satellite.

In some embodiments, the movement direction of the satellite cell may be a movement direction of the satellite cell relative to the reference direction. For example, the reference direction here may be the rotation direction of the earth. In some embodiments, the motion trajectory of the satellite cell is preset, and the movement direction of the satellite cell at any moment is fixed. Therefore, the satellite cell may send the movement direction information of the satellite cell at any moment or time period to the terminal by the measurement configuration parameter information.

In some embodiments, the movement speed of the satellite cell may be the movement speed of the satellite cell relative to the reference speed. For example, the movement speed of the satellite cell may be the movement speed of the satellite cell relative to the rotation speed of the earth. In some embodiments, the motion trajectory and the motion period of the satellite cell are preset, and the movement speed of the satellite cell at any moment is fixed. Therefore, the satellite cell may send the movement speed information of the satellite at any moment or time period to the terminal by the measurement configuration parameter information.

In some embodiments, the position of the satellite cell may be the position of the satellite cell relative to the reference coordinate system. For example, the coordinate position here is a position relative to a ground coordinate system. In some embodiments, the motion trajectory and the motion period of the satellite cell are preset, and the position of the satellite cell at any moment is fixed. Therefore, the satellite cell may send the position information of the satellite cell at any moment or time period to the terminal by the measurement configuration parameter information.

In some embodiments, the movement information carries an identity document (ID) of the satellite. Here, the identity document of the satellite is used to uniquely identify a satellite. The identity document (ID) of the satellite may be associated with other information of the satellite. For example, the identity document of the satellite is "A", and then "A" may be associated with the movement trajectory information of the satellite, the movement speed information of the satellite, the movement direction information of the satellite, the position information of the satellite, and the signal coverage range information to establish a corresponding mapping relationship. In some embodiments, after the terminal receives the movement information, as shown in Table 2, the mapping relationship may be stored in the terminal in the form of a list. For the satellite with a satellite identifier of "A", the movement speed is S1, the movement direction is K1, and the position of the satellite is C1; for the satellite with a satellite identifier of "B", the movement speed is S2, the movement direction is K2, and the position of the satellite is C2.

TABLE 2

| Satellite Identifier | Movement Speed Information of the Satellite | Movement Direction Information of the Satellite | Position Information of the Satellite |
|---|---|---|---|
| A | S1 | K1 | C1 |
| B | S2 | K2 | C2 |

In some embodiments, the satellite sends the movement information of the satellite to the terminal for the terminal to access the satellite, in response to the terminal establishing a radio resource control (RRC) connection with the satellite. In this way, when the terminal needs to access the satellite again at the next time, the terminal may determine whether to access the satellite using the movement information. For example, at moment A, the terminal establishes a radio resource control (RRC) connection with the satellite 1, and the satellite 1 sends the movement information of the satellite 1 to the terminal for the terminal to access the satellite 1. At moment B, the terminal in the idle state needs to access the satellite again, and at this time, the terminal and the satellite 1 move in the opposite direction, the movement speed of the terminal is a, the movement speed of the satellite 1 indicated by the movement information is b, the speed of the terminal relative to the satellite 1 is x=a+b, and when x is smaller than the access threshold X for accessing the satellite 1, the terminal may select the satellite 1 to access and establish a connection with the satellite 1.

In some embodiments, the satellite stores with movement information of a plurality of satellites. The terminal receives the movement information of the plurality of satellites sent by the satellite and selects one of the satellites for access.

In some embodiments, after receiving the movement information of the satellite sent by each satellite for the terminal to access the satellite, the terminal stores the movement information. For example, the terminal sequentially receives the movement information sent by the satellite 1, the satellite 2 and the satellite 3, and the terminal sequentially stores the movement information sent by the satellite 1, the satellite 2 and the satellite 3. In some embodiments, the movement information carries identifier information of a corresponding satellite, and the terminal may store the movement information of the corresponding satellite according to the identifier information.

In some embodiments, the movement trajectory of the satellite is updated, and the movement information of the satellite is updated synchronously. The satellite sends the updated movement information of the satellite to the terminal for the terminal to access the satellite, in response to the terminal establishing a radio resource control (RRC) connection with the satellite. After receiving the updated movement information, the terminal updates the movement information of the satellite stored in the terminal synchronously by using the updated movement information. In some embodiments, the satellite control center may update the movement trajectory of the satellite. For example, at time period A, the satellite operates on orbit A. At time period B, the satellite is controlled to operate on orbit B according to the scheduling strategy of the satellite control center. At this time, the satellite control center updates the movement trajectory of the satellite, and the movement information of the satellite may also be updated synchronously.

In some embodiments, when the terminal establishes a radio resource control (RRC) connection with the satellite, the terminal sends an acquisition request for the movement information of the satellite to the satellite, and after receiving the acquisition request, the satellite sends the movement information of the satellite associated with the acquisition request to the terminal for the terminal to access the satellite. Here, the terminal periodically sends the acquisition request to the satellite until the movement information of the satellite associated with the acquisition request for the terminal to access the satellite fed back by the satellite is received. In this way, the situation that the satellite cannot receive the acquisition request due to the poor wireless communication environment with the satellite is reduced, and the reliability of obtaining the request transmission is improved.

In some embodiments, the satellite sends movement information associated with the acquisition request to the terminal in response to receiving an acquisition request for the movement information sent by the terminal to the satellite after receiving a trigger instruction from the user. For example, the terminal works in a remote mountainous environment, the density of the base station is small, the signal coverage is poor, resulting in that the signal environment is not good, and there is the condition of abnormal network connection frequently when the user uses the terminal. At this time, the user may trigger the terminal to send an acquisition request for the movement information to the satellite. After receiving the acquisition request, the satellite sends the movement information associated with the acquisition request to the terminal. In this way, the terminal may use the movement information to access the satellite. Due to the fact that the communication signal of the satellite is less affected by the mountainous environment, the terminal performs wireless communication through the satellite, so that the communication experience of the user can be improved.

In some embodiments, the satellite sends movement information associated with the acquisition request to the terminal in response to an acquisition request for the movement information sent to the satellite after the strength of the wireless communication signal sent by the base station detected by the terminal is less than the first signal threshold. For example, the terminal works in a remote mountainous area, the density of the base station is small, and the signal coverage is poor, resulting in that the signal environment is not good. When the strength of the wireless communication signal detected by the terminal is less than the first signal threshold, it may trigger an acquisition request for the movement information sent by the terminal to the satellite. After receiving the acquisition request, the satellite sends the movement information associated with the acquisition request to the terminal. In this way, the terminal may use the movement information to access the satellite. In this way, the terminal may use the movement information to establish a wireless communication connection with the satellite. Due to the fact that the communication signal of the satellite is less affected by the mountainous environment, the terminal performs wireless communication through the satellite, so that the communication experience of the user can be improved.

In some embodiments, the first signal threshold is less than the second signal threshold, and the second signal threshold is a signal threshold of switching from communication with the first base station to communication with the second base station, configured for the situation of signal strength becoming weaker when the terminal communicates with the first base station. In this way, since the first signal threshold is less than the second signal threshold, the switch condition for switching from the first base station to the second base station may be satisfied. When there is a second base station available for connection, the terminal switches from communication with the first base station to communication with the second base station, instead of sending the acquisition request for acquiring the movement information of the satellite to the satellite to acquire the movement information and access the satellite. In this way, the situation of unnecessary access to the satellite when the terminal has the second base station for switch is reduced.

In some embodiments, the satellite receives an acquisition request for the movement information sent by the terminal to the satellite when it starts up, and sends the movement information associated with the acquisition request to the terminal. After receiving the acquisition request sent by the base station, the satellite sends the movement information associated with the switch request to the terminal. In this way, the terminal may select a satellite cell of one satellite to reside according to the movement information.

In some embodiments, the satellite receives an acquisition request for the movement information sent by the terminal to the satellite when needing to perform cell switch, and sends the movement information associated with the acquisition request to the terminal. In this way, the terminal may select a satellite cell of a satellite for switch according to the movement information.

In some embodiments, the satellite sends the movement information associated with the switch request to the terminal in response to receiving the switch request sent by the base station. For example, the quantity of loads connected to the base station exceeds a quantity threshold, and in order to reduce the load of the base station, the base station sends a switch request for requesting the satellite to allow the terminal to establish a wireless communication connection with the satellite. After receiving the switch request sent by the base station, the satellite sends the movement information associated with the switch request to the terminal. In this way, the terminal may use the movement information to establish wireless communication with the satellite, thus alleviating the pressure that the quantity of connected loads of the base station exceeds the quantity threshold. In some embodiments, the switch request sent by the base station to the satellite carries identifier information of the terminal. In response to receiving the switch request sent by the base station, the satellite sends the movement information associated with the switch request to the terminal indicated by the identifier information. The identifier information is used to uniquely identify the terminal. Here, the identifier information of the terminal may be a subscriber identity module (SIM) number of a subscriber identity module (SIM) included in the terminal.

Figure 8:
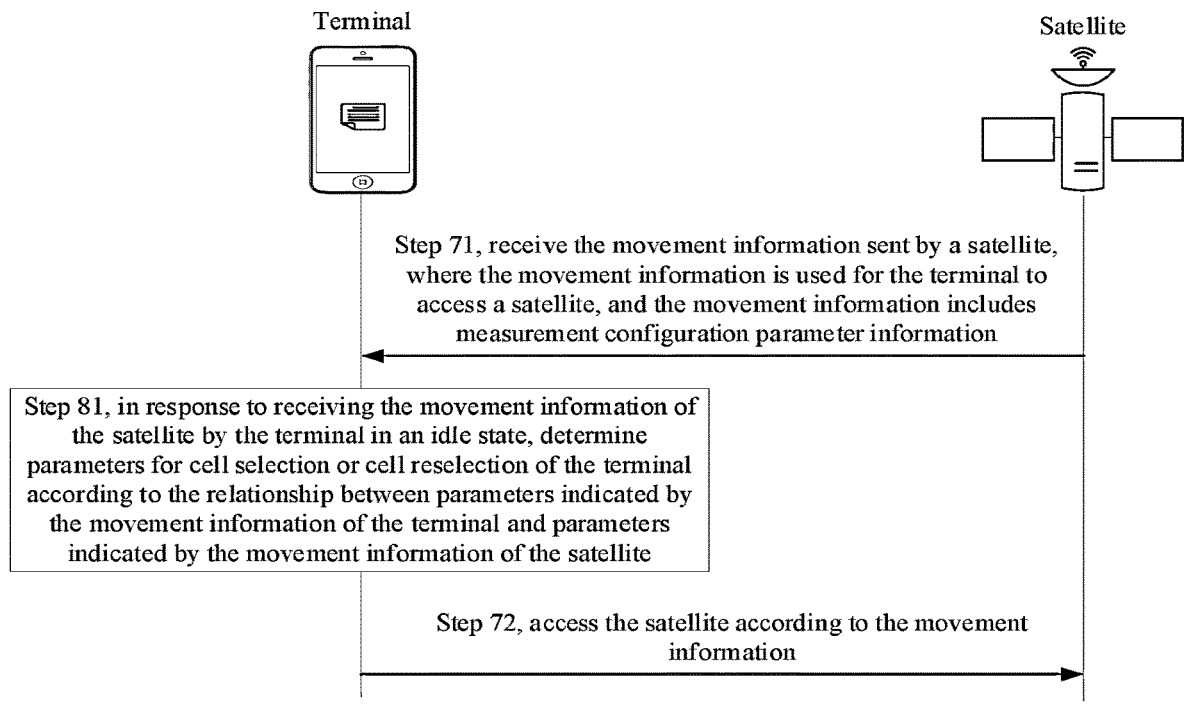
FIG. 8 is a flowchart of a method for accessing a satellite according to an embodiment.

As shown in FIG. 8, the present embodiment provides a method for accessing a satellite, where the method further includes that, in step 81, in response to receiving the movement information of the satellite by the terminal in an idle state, parameter for cell selection or cell reselection of the terminal is determined according to the relationship between the parameters indicated by the movement information of the terminal and the parameters indicated by the movement information of the satellite.

In some embodiments, the parameters indicated by the movement information of the terminal is the movement direction of the terminal measured by the terminal. The parameters indicated by the movement information of the satellite is the motion direction of the satellite. For example, the reference direction of the movement of the terminal in the idle state is direction A, and at moment a, the offset of the motion direction of the satellite measured by the satellite relative to the direction A is 30°, and the offset of the movement direction of the terminal measured by the terminal relative to the direction A is 120°, the relative offset of the movement direction of the terminal measured by the terminal relative to the motion direction of the satellite is x1=120°−30°=90°, that is, 90° is the relative offset of the movement direction of the terminal measured by the terminal relative to the motion direction of the satellite. The relative offset may be determined as parameters for cell selection or cell reselection of the terminal. The terminal in the idle state determines to access the satellite according to the parameters for cell selection or cell reselection.

In some embodiments, the parameters indicated by the movement information of the terminal is the movement speed of the terminal measured by the terminal. The parameters indicated by the movement information of the satellite is the movement speed of the satellite. For example, the reference speed in which the terminal moves in the idle state is the rotation speed of the earth, and at moment a, the difference of the motion speed of the satellite measured by the satellite relative to the reference speed is 300, and the difference of the movement speed of the terminal measured by the terminal relative to the reference speed is 400, and the relative difference of the movement speed measured by the terminal and the motion speed of the satellite is y1=400−300=100, that is, 100 is the relative movement speed of the terminal measured by the terminal relative to the satellite. The relative movement speed may be determined as parameters for cell selection or cell reselection for the terminal. The terminal in the idle state determines to access the satellite according to the parameters for cell selection or cell reselection.

Figure 9:
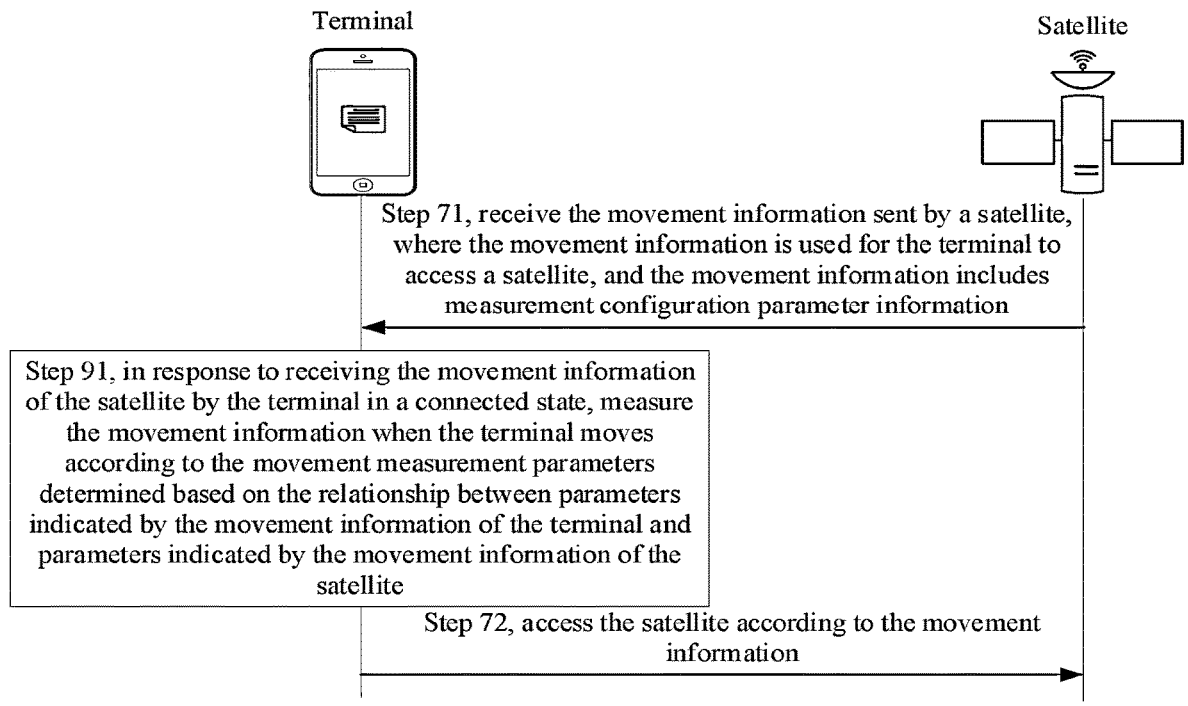
FIG. 9 is a flowchart of a method for accessing a satellite according to an embodiment.

As shown in FIG. 9, the present embodiment provides a method for accessing a satellite, where the method further includes that, in step 91, in response to receiving the movement information of the satellite by the terminal in a connected state, the movement information when the terminal moves is measured according to the movement measurement parameters determined based on the relationship between the parameters indicated by the movement information of the terminal and the parameters indicated by the movement information of the satellite.

In some embodiments, the parameters indicated by the movement information of the terminal is the movement direction of the terminal measured by the terminal. The parameters indicated by the movement information of the satellite is the motion direction of the satellite. For example, the reference direction of the movement of the terminal in the connected state is the direction A, and at moment a, the offset of the motion direction of the satellite measured by the satellite relative to the direction A is 30°, the offset of the movement direction of the terminal measured by the terminal relative to the direction A is 120°, and the relative offset of the movement direction of the terminal measured by the terminal relative to the motion direction of the satellite is x1=120°−30°=90°, that is, 90° is the relative offset of the of movement direction of the terminal measured by the terminal relative to the motion direction of the satellite. The relative offset is determined as the movement information when the terminal moves.

In some embodiments, the parameters indicated by the movement information of the terminal is the movement speed of the terminal measured by the terminal. The parameters indicated by the movement information of the satellite is the movement speed of the satellite. For example, the reference speed in which the terminal moves in the connected state is the rotation speed of the earth, and at moment a, the difference of the motion speed of the satellite measured by the satellite relative to the reference speed is 300, and the difference of the movement speed of the terminal measured by the terminal relative to the reference speed is 400, and relative difference of the movement speed of the terminal measured by the terminal relative to the motion speed of the satellite is y1=400−300=100, that is, 100 is the relative movement speed of the terminal measured by the terminal relative to the satellite. The relative movement speed is determined as the movement information when the terminal moves.

Figure 10:
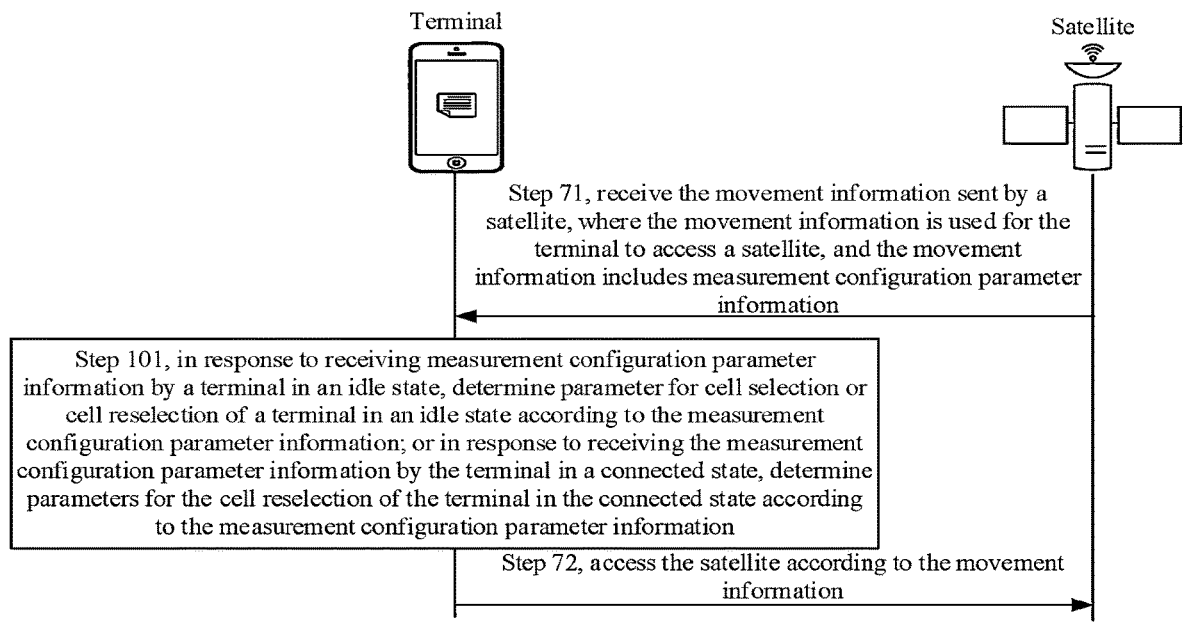
FIG. 10 is a flowchart of a method for accessing a satellite according to an embodiment.

As shown in FIG. 10, the present embodiment provides a method for accessing a satellite, where the method further includes that, in step 101, in response to receiving measurement configuration parameter information by a terminal in an idle state, parameters for cell selection or cell reselection of a terminal in an idle state is determined according to the measurement configuration parameter information. Alternatively, in response to receiving the measurement configuration parameter information by the terminal in a connected state, the parameters for the cell reselection of the terminal in the connected state is determined according to the measurement configuration parameter information.

In some embodiments, the measurement configuration parameter information received by the terminal in the idle state is the motion direction of the satellite. For example, the reference direction of the movement of the terminal in the idle state is the direction A, and at moment a, the offset of the motion direction of the satellite measured by the satellite relative to the direction A is 30°, the offset of the movement direction of the terminal measured by the terminal relative to the direction A is 120°, and the relative offset of the movement direction of the terminal measured by the terminal relative to the motion direction of the satellite is x1=120°−30°=90°, that is, 90° is the relative offset of the movement direction of the terminal measured by the terminal relative to the motion direction of the satellite. The relative offset may be determined as parameters for cell selection or cell reselection of the terminal. The terminal in the idle state determines to access the satellite according to the parameters for cell selection or cell reselection.

In some embodiments, the measurement configuration parameter information received by the terminal in the idle state is the movement speed of the satellite. For example, the reference speed in which the terminal moves in the idle state is the rotation speed of the earth, and at moment a, the difference of the motion speed of the satellite measured by the satellite relative to the reference speed is 300, and the difference of the movement speed of the terminal measured by the terminal relative to the reference speed is 400, and the relative difference of the movement speed of the terminal measured by the terminal relative to the motion speed of the satellite is y1=400−300=100, that is, 100 is the relative movement speed of the terminal measured by the terminal relative to the satellite. The relative movement speed may be determined as parameters for cell selection or cell reselection of the terminal. The terminal in the idle state determines to access the satellite according to the parameters for cell selection or cell reselection.

In some embodiments, the measurement configuration parameter information received by the terminal in the connected state is the motion direction of the satellite. For example, the reference direction of the movement of the terminal in the connected state is the direction A, and at moment a, the offset of the motion direction of the satellite measured by the satellite relative to the direction A is 30°, the offset of the movement direction of the terminal measured by the terminal relative to the direction A is 120°, and the relative offset of the movement direction of the terminal measured by the terminal relative to the motion direction of the satellite is x1=120°−30°=90°, that is, 90° is the relative offset of the movement direction of the terminal measured by the terminal relative to the motion direction of the satellite. The relative offset may be determined as parameters for cell reselection of the terminal. The terminal in the connected state determines to access the satellite according to the parameters for cell reselection.

In some embodiments, the measurement configuration parameter information received by the terminal in the connected state is the movement speed of the satellite. For example, the reference speed in which the terminal moves in the connected state is the rotation speed of the earth, and at moment a, the difference of the motion speed of the satellite measured by the satellite relative to the reference speed is 300, and the difference of the movement speed of the terminal measured by the terminal relative to the reference speed is 400, and the relative difference of movement speed of the terminal measured by the terminal relative to the motion speed of the satellite is y1=400−300=100, that is, 100 is the relative movement speed of the terminal measured by the terminal relative to the satellite. The relative movement speed may be determined as the parameters for the cell reselection of the terminal. The terminal in the connected state determines to access the satellite according to the parameter reselected by the cell.

Figure 11:
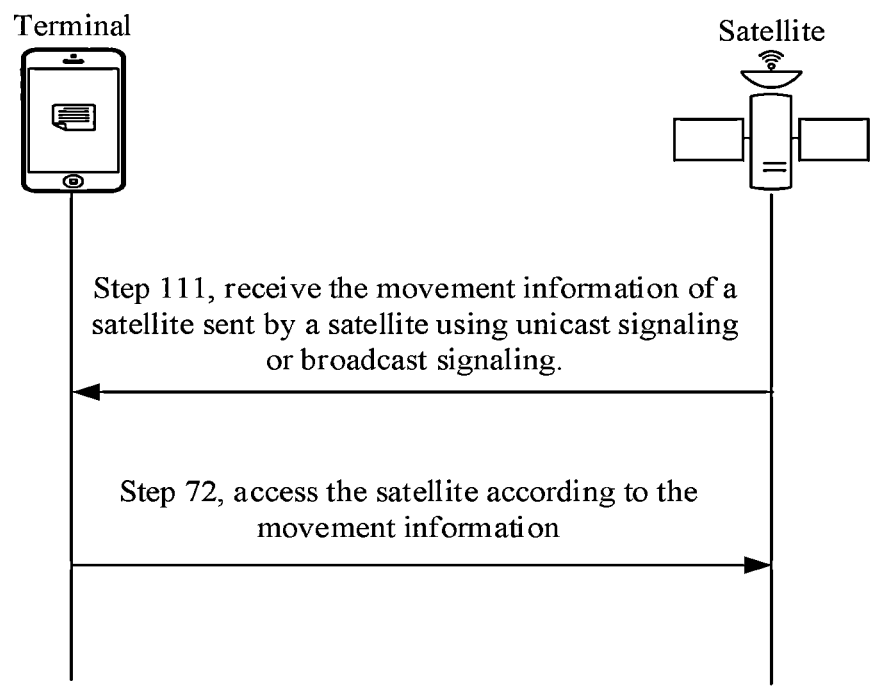
FIG. 11 is a schematic diagram of a method for accessing a satellite according to an embodiment.

As shown in FIG. 11, the present embodiment provides a method for accessing a satellite, where in step 71, receiving movement information of a satellite sent by a satellite includes that, in step 111, movement information of a satellite sent by a satellite using unicast signaling or broadcast signaling is received. In some embodiments, unicast signaling and/or broadcast signaling is radio resource control (RRC) signaling.

In this way, the existing radio resource control (RRC) signaling can be used to carry the movement information, thus realizing multiplexing of the radio resource control (RRC) signaling, and improving the compatibility of the signaling.

Figure 12:
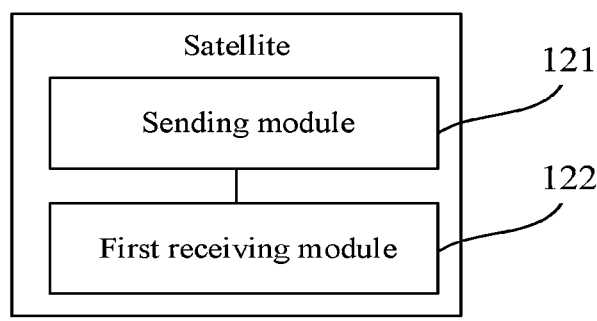
FIG. 12 is a schematic diagram of a satellite according to an embodiment.

As shown in FIG. 12, the present embodiment provides a satellite, where the satellite includes a sending module 121, where the sending module 121 is configured to send movement information of the satellite to the terminal, where the movement information is used for the terminal to access the satellite, and the movement information includes measurement configuration parameter information.

In some embodiments, the satellite further includes a first receiving module 122, where, the first receiving module 122 is further configured to receive movement information sent by the base station, where the movement information is determined by the satellite control center and sent to the base station. Alternatively, to receive movement information sent by the satellite control center, where the movement information is determined by the base station and sent to the satellite control center.

In some embodiments, the sending module 121 is further configured to send the movement information of the satellite to the terminal by using unicast signaling or broadcast signaling.

Figure 13:
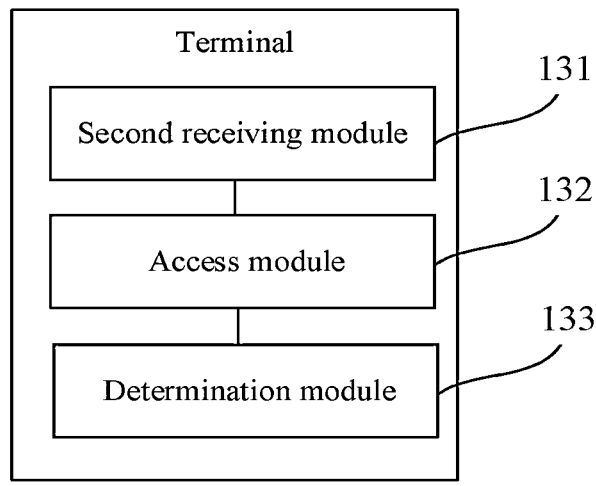
FIG. 13 is a schematic diagram of an apparatus for accessing a satellite according to an embodiment.

As shown in FIG. 13, the present embodiment provides a terminal, where the terminal includes a second receiving module 131 and an access module 132, where the second receiving module 131 is configured to receive movement information of a satellite sent by the satellite, where the movement information is used for the terminal to access a satellite, and the movement information includes measurement configuration parameter information, and the access module 132 is configured to access a satellite according to the movement information.

In some embodiments, the terminal further includes a determination module 133, where the determination module 133 is configured to: in response to receiving the movement information by the terminal in the idle state, determine parameters for cell selection or cell reselection of the terminal according to the relationship between the parameters indicated by the movement information of the terminal and the parameters indicated by the movement information.

In some embodiments, the terminal further includes a determination module 133, where the determination module 133 is configured to: in response to receiving the movement information by the terminal in a connected state, measure the movement information when the terminal moves according to the movement measurement parameters determined based on the relationship between the parameters indicated by the movement information of the terminal and the parameters indicated by the movement information.

In some embodiments, the terminal further includes a determination module 133, where the determination module 133 is configured to: in response to receiving the measurement configuration parameter information by the terminal in the idle state, determine parameters for cell selection or cell reselection of the terminal in an idle state, according to the measurement configuration parameter information. Alternatively, in response to receiving the measurement configuration parameter information by the terminal in the connected state, to determine the parameters for the cell reselection of the terminal in the connected state according to the measurement configuration parameter information.

In some embodiments, the second receiving module 131 is further configured to receive movement information of a satellite sent by the satellite using unicast signaling or broadcast signaling.

With regard to the apparatus in the above embodiments, the specific manner, in which each module performs an operation, has been described in detail in the embodiments related to the method, and will not be described in detail here.

Embodiments of the present disclosure provide a communication device, including a processor and a memory for storing an instruction executable by the processor. The processor is configured to, when running the executable instruction, implement the method applied to any embodiment of the present disclosure.

Among them, the processor may include various types of storage medium, and the storage medium is a non-transitory computer storage medium, and may continue to memorize the information stored on there after the communication device is powered down.

The processor may be connected to the memory through a bus or the like, and configured to read an executable program stored on the memory.

Embodiments of the present disclosure further provide a computer storage medium, where the computer storage medium stores with a computer-executable program, and when the executable program is executed by the processor, the method of any embodiment of the present disclosure is implemented.

With regard to the apparatus in the above embodiments, the specific manner, in which each module performs an operation, has been described in detail in the embodiments related to the method, and will not be described in detail here.

Figure 14:
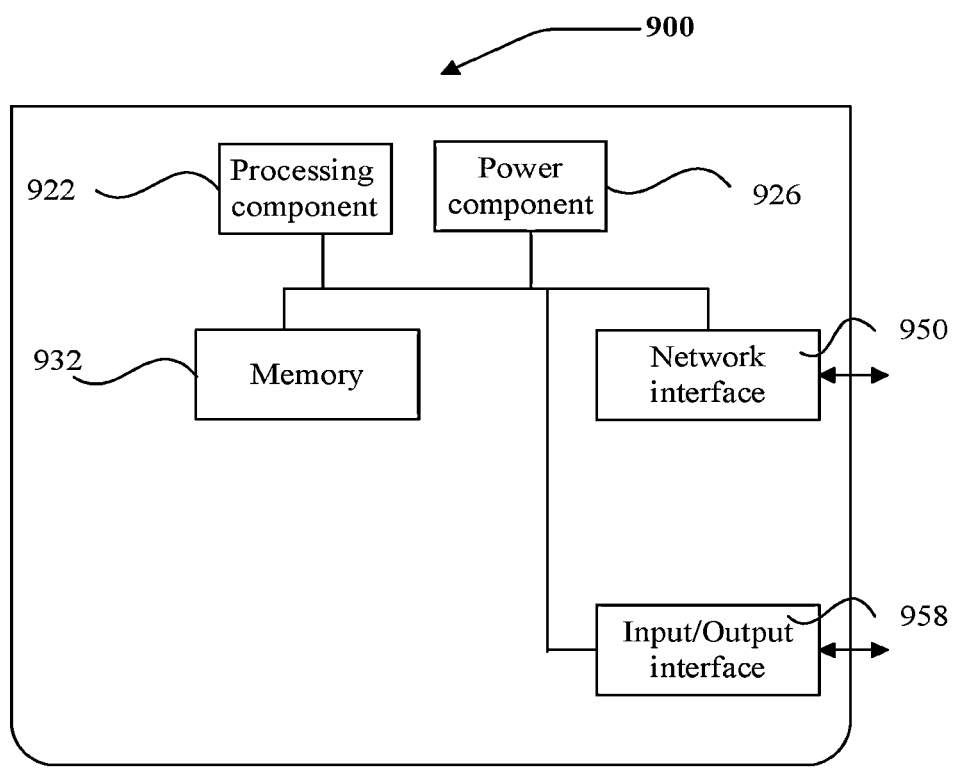
FIG. 14 is a block diagram of a base station according to an embodiment.

As shown in FIG. 14, an embodiment of the present disclosure illustrates a structure of a base station. For example, base station 900 may be provided as a network-side device. Referring to FIG. 14, base station 900 includes processing component 922, which further includes one or more processors, and memory resources represented by memory 932, for storing instructions executable by processing component 922, such as an application. The application stored in the memory 932 may include one or more modules each corresponding to a set of instructions. In addition, the processing component 922 is configured to execute an instruction to perform the any foregoing method described above applied in the base station, for example, as shown in FIGS. 4-6.

Embodiments of the present disclosure disclose a method for accessing a satellite, applied to a satellite, where the method includes sending movement information of the satellite to a terminal, where the movement information is configured for the terminal to access the satellite, and the movement information includes measurement configuration parameter information.

According to some embodiments of the present disclosure, there is provided a method for accessing a satellite, applied to a terminal, and where the method includes receiving movement information of the satellite sent by the satellite, where the movement information is configured for the terminal to access the satellite, and the movement information includes measurement configuration parameter information, and accessing the satellite according to the movement information.

According to some embodiments of the present disclosure, there is provided a satellite, including a sending module, where the sending module is configured to send movement information of the satellite to a terminal, the movement information is configured for the terminal to access the satellite, and the movement information includes measurement configuration parameter information.

According to some embodiments of the present disclosure, there is provided a terminal, including second receiving module and an access module, where the second receiving module is configured to receive movement information of the satellite sent by a satellite, where the movement information is configured for the terminal to access the satellite, and the movement information includes measurement configuration parameter information, and the access module is configured to access the satellite according to the movement information.

According to some embodiments of the present disclosure, there is provided a communication device, including a processor and a memory that is configured to store an instruction executable by the processor. The processor is configured to implement the method according to any one of the embodiments of the present disclosure, when running the executable instruction.

According to some embodiments of the present disclosure, there is provided a computer storage medium, storing with a computer-executable program, and when the executable program is executed by a processor, the method according to any one of embodiments of the present disclosure is implemented.

In the embodiments of the present disclosure, the movement information of the satellite is sent to the terminal, where the movement information is configured for the terminal to access the satellite, and the movement information includes measurement configuration parameter information. In this way, when the terminal needs to access the satellite, the terminal can measure the parameters related to the access to the satellite based on the movement information of the satellite, and the terminal measures the related parameters by integrating the movement information of the satellite. Compared with the measurement of the related parameters under the condition of not considering the motion of the satellite, the related parameters measured by the present scheme can be more accurate, so that the terminal can reliably access the satellite for wireless communication.

Other embodiments of the present disclosure will be apparent to those skilled in the art from consideration of the specification and practice of the present disclosure disclosed here. The present disclosure is intended to cover any variations, uses, or adaptations of the present disclosure following the general principles of the present disclosure and including common general knowledge or customary technical means in the art not disclosed in this disclosure. It is intended that the specification and examples be considered as examples, with a true scope and spirit of the present disclosure being indicated by the following claims.

It should be understood that the present disclosure is not limited to the precise construction that has been described above and illustrated in the accompanying drawings, and that various modifications and changes may be made without departing from the scope thereof. It is intended that the scope of the present disclosure be limited by the appended claims.

What is claimed is:

1. A method for accessing a satellite, applied to the satellite, wherein the method comprises:
   sending movement information of the satellite to a terminal;
   wherein the movement information is configured for the terminal to access the satellite, and the movement information comprises measurement configuration parameter information;
   wherein the measurement configuration parameter information comprises:
   direction coefficient information, comprising an offset of a motion direction of the satellite to a reference direction, and configured for the terminal to measure a relative offset of a movement direction of the terminal to the motion direction of the satellite.

2. The method according to claim 1, wherein the measurement configuration parameter information further comprises:
   speed coefficient information, comprising a ratio of a motion speed of the satellite to a reference speed, and configured for the terminal to measure a movement speed of the terminal relative to the satellite.

3. The method according to claim 2, wherein the reference direction is a reference direction toward which the terminal moves; and/or, the reference speed is a reference speed in which the terminal moves.

4. The method according to claim 1, wherein the movement information comprises at least one of movement information of the satellite and movement information of a satellite cell formed by the satellite.

5. The method according to claim 4, wherein the movement information of the satellite comprises at least one of following information:
   movement direction information of the satellite;
   movement speed information of the satellite; and
   position information of the satellite.

6. The method according to claim 4, wherein the movement information of the satellite cell comprises at least one of following information:
   movement direction information of the satellite cell;
   movement speed information of the satellite cell; and
   position information of the satellite cell.

7. The method according to claim 1, further comprising:
   receiving the movement information sent by a base station, wherein the movement information is determined by a satellite control center and sent to the base station; or
   receiving the movement information sent by the satellite control center, wherein the movement information is determined by the base station and sent to the satellite control center.

8. The method according to claim 1, wherein the sending the movement information of the satellite to the terminal comprises:
   sending the movement information of the satellite to the terminal using a unicast signaling or a broadcast signaling.

9. A method for accessing a satellite, applied to a terminal, wherein the method comprises:

receiving movement information of the satellite sent by the satellite, wherein the movement information is configured for the terminal to access the satellite, and the movement information comprises measurement configuration parameter information; and accessing the satellite according to the movement information;

wherein the measurement configuration parameter information comprises:

direction coefficient information, comprising an offset of a motion direction of the satellite to a reference direction, and configured for the terminal to measure a relative offset of a movement direction of the terminal to the motion direction of the satellite.

10. The method according to claim 9, wherein the measurement configuration parameter information further comprises:

speed coefficient information, comprising a ratio of a motion speed of the satellite to a reference speed, and configured for the terminal to measure a movement speed of the terminal relative to the satellite.

11. The method according to claim 10, wherein the reference direction is a reference direction toward which the terminal moves; and/or, the reference speed is a reference speed in which the terminal moves.

12. The method according to claim 9, wherein the movement information comprises at least one of movement information of the satellite and movement information of a satellite cell formed by the satellite.

13. The method according to claim 12, wherein the movement information of the satellite comprises at least one of following information:

movement direction information of the satellite;
movement speed information of the satellite; and
position information of the satellite.

14. The method according to claim 12, wherein the movement information of the satellite cell comprises at least one of following information:

movement direction information of the satellite cell;
movement speed information of the satellite cell; and
position information of the satellite cell.

15. The method according to claim 13, further comprising:

determining, in response to receiving the movement information of the satellite by the terminal in an idle state, parameters for cell selection or cell reselection of the terminal according to a relationship between parameters indicated by movement information of the terminal and parameters indicated by the movement information of the satellite.

16. The method according to claim 13, further comprising:

measuring, in response to receiving the movement information of the satellite by the terminal in a connected state, movement information of the terminal in movement according to movement measurement parameters determined based on a relationship between parameters indicated by the movement information of the terminal and parameters indicated by the movement information of the satellite.

17. The method according to claim 9, further comprising:

determining, in response to receiving the measurement configuration parameter information by the terminal in an idle state, parameters for cell selection or cell reselection of the terminal in the idle state according to the measurement configuration parameter information; or, determining, in response to receiving the measurement configuration parameter information by the terminal in a connected state, parameters for cell reselection of the terminal in the connected state according to the measurement configuration parameter information.

18. The method according to claim 9, wherein the receiving the movement information of the satellite sent by the satellite comprises:

receiving the movement information of the satellite sent by the satellite using a unicast signaling or a broadcast signaling.

19. A communication device, comprising:

a processor; and a memory, configured to store an instruction executable by the processor, wherein the processor is configured to, when running the instruction, implement a method for accessing a satellite, applied to the satellite, wherein the method comprises:

sending movement information of the satellite to a terminal;

wherein the movement information is configured for the terminal to access the satellite, and the movement information comprises measurement configuration parameter information;

wherein the measurement configuration parameter information comprises:

direction coefficient information, comprising an offset of a motion direction of the satellite to a reference direction, and configured for the terminal to measure a relative offset of a movement direction of the terminal to the motion direction of the satellite.

20. A communication device, comprising:

a processor; and a memory, configured to store an instruction executable by the processor, wherein the processor is configured to implement the method according to the method of claim 9 when running the instruction.

* * * * *